United States Patent Office 3,004,922
Patented Oct. 17, 1961

3,004,922
EMULSIONS OF PHOSPHATIDES IN AQUEOUS ALCOHOL AND THEIR PREPARATION
Carl Heinz Buer, 159 Eupenerstrasse, Koln-Braunsfeld, Germany
No Drawing. Filed Dec. 14, 1956, Ser. No. 628,231
Claims priority, application Germany Dec. 17, 1955
5 Claims. (Cl. 252—312)

The present invention is concerned with the preparation of emulsions of phosphatides in aqueous alcohol.

In order to prepare high-percentage emulsions of phosphatides in aqueous alcohol, the process has hitherto been carried out of adding the phosphatide with constant stirring to a highly heated solution of alcohol in water, said solution containing at least 6% but not more than 35% of a carbohydrate. As carbohydrates the following come into question: monosaccharides such as pentoses and hexoses, disaccharides such as saccharose, maltose and lactose, and polysaccharides such as starch, are concerned. Emulsions having a content of up to 15% phosphatide and an alcohol concentration of 5–25% may be prepared by this process.

It has been discovered that the stability of the emulsions obtained according to the above-described process which have a specific gravity greater than 1.0 varies according to the neutral fat content of the phosphatide; pure phosphatides yield unstable emulsions, but phosphatides having a small neutral fat content lead to stable emulsions. This varying behaviour of phosphatides is due to the fact that the fine phosphatide particles are coated with the neutral fat in the form of a very thin film which covers the hydrophobic groups of the phosphatide molecules and thus makes possible the preparation of high-percentage, stable phosphatide emulsions.

The process of the invention is preferably carried out by converting the phosphatides into an emulsion—as indicated above—with those neutral fats with which they are associated in nature. Such a neutral fat is added to the emulsifying phosphatide, or the phosphatide is incompletely freed during its preparation from the adhering neutral fat. For example, one proceeds by adding to the phosphatide, such as lecithin, which is to be emulsified, a small quantity of the oil which has been extracted by acetone from the crude lecithin; or alternatively, during the preparation of the crude lecithin the extraction with acetone is left incomplete.

Preferably the aqueous alcohol employed in the process according to the present invention contains no more than 25% alcohol.

For the preparation of a stable emulsion a quantity of fat with the range of 0.5–5%, calculated with respect to the phosphatide to be emulsified, has proved particularly suitable. Preferably the resulting emulsions contain at least 5% of phosphatide.

In the phosphatides are included the esters of the various aliphatic saturated and unsaturated carboxylic acids having a carbon number of 16–26 with an alcohol to which a nitrogenous base such as choline or colamine is bound via a phosphoric acid residue. The phosphatide occuring most frequently in nature is lecithin, a glycerophosphatide. In this connection, choline- and colamine-lecithin (also known as cephalin) are distinguished by whether the nitrogen base bound via the phosphoric acid residue is choline or colamine. The number of lecithine is increased furthermore by the possibility that the phosphoric acid residue carrying the nitrogen base may be located in the 2- or the 3-position of the glycerine residue. The two other hydroxyl groups of the glycerine residue, i.e. positions 1 and 3 or 1 and 2, may either or both be esterified by saturated or unsaturated fatty acids having carbon numbers of 16–26. In the case of two fatty acids these are usually of different types and one of them is unsaturated, in which connection even within a given quantity of lecithin the proportions of saturated and unsaturated acids can vary over a wide range.

Example 1

100 g. of fat-free choline-colamine-lecithin are emulsified in 1000 ccm. of a solution heated to 80° C. of 80 g. dextrose in 15% aqueous ethyl alcohol by means of a suitable stirring appartus. After completion of the addition, stirring is continued for a further 5 minutes. The resulting emulsion proves to be unstable however.

Example 2

By working according to Example 1, but adding simultaneously with the lecithin about 1 g. of the oil contained in the crude lecithin, a completely stable, high-percentage emulsion is obtained. The particle size of the lecithin in the emulsion amounts to between 0.03 and $0.06\mu$. The specific gravity of the emulsion is greater than 1.

Example 3

150 g. of incompletely defatted lecithin with an oil content of about 2% are added portionwise and with stirring to a solution heated to 70° C. of 20 g. saccharose and 100 g. dextrose in 1400 ccm. of 15% aqueous alcohol and stirred for 8 minutes; a completely stable, high-percentage emulsion is obtained. The particle size of the lecithin in the emulsion amounts to between 0.03 and $0.06\mu$. The specific gravity of the emulsion is greater than 1.

The emulsions obtained according to the present invention may be used in a variety of fields for many different purposes, for example in the chocolate and confectionery industries, for the treatment of hides and in the preparation of creams for use in cosmetics.

What I claim is:

1. A process for the preparation of stable emulsions of phosphatides comprising stirring a phosphatide containing naturally associated neutral fat in an amount of about .5 to 5 percent by weight of the phosphatide, into an aqueous solution having a temperature of about 70 to 80° C. and containing about 5 to 25 percent of ethyl alcohol and a carbohydrate, said carbohydrate being employed in an amount of about 6 to 35 percent by weight and said phosphatide in an amount of about 5 to 15 percent by weight of the emulsion.

2. The process defined in claim 1, wherein said carbohydrate is a monosaccharide selected from the group consisting of pentoses and hexoses.

3. The process defined in claim 1 wherein said carbohydrate is a disaccharide selected from the group consisting of saccharose, maltose, and lactose.

4. The process as defined in claim 1 wherein said carbohydrate is starch.

5. A stable lecithin emulsion in aqueous alcohol consisting essentially of about 5 to 25 percent by weight of ethyl alcohol, about 5 to 15 percent of lecithin of a particle size of about 0.03 to 0.06 microns, a neutral fat in an amount of about 0.5 to 5 percent by weight of the lecithin, and about 6 to 35 percent, calculated on the weight of the emulsion, of a carbohydrate, the balance being water.

References Cited in the file of this patent

UNITED STATES PATENTS

| | | |
|---|---|---|
| 1,150,691 | Martin | Aug. 17, 1915 |
| 1,464,557 | Bollmann | Aug. 14, 1923 |
| 1,667,767 | Bollmann | May 1, 1928 |
| 1,859,240 | Jordan | May 17, 1932 |
| 1,934,005 | Rewald | Nov. 7, 1933 |
| 2,057,695 | Schwieger | Oct. 20, 1936 |